United States Patent [19]

Goldstein

[11] Patent Number: 4,764,011
[45] Date of Patent: Aug. 16, 1988

[54] SIGHTING DEVICE FOR DAY AND NIGHT USE

[75] Inventor: Pinchas Goldstein, Jerusalem, Israel

[73] Assignee: Mepro Kibbutz Hagoshrim, Kibbutz Hagoshrim, Israel

[21] Appl. No.: 929,627

[22] Filed: Nov. 12, 1986

[30] Foreign Application Priority Data

Nov. 15, 1985 [IL] Israel .......................................... 77065

[51] Int. Cl.$^4$ ............................................. G02B 23/10
[52] U.S. Cl. ......................................... 356/251; 33/241
[58] Field of Search ................... 356/251; 33/233, 241

[56] References Cited

U.S. PATENT DOCUMENTS

| | | | |
|---|---|---|---|
| 2,633,051 | 3/1953 | Davis | 88/2.3 |
| 3,524,710 | 8/1970 | Rickert | 356/251 |
| 3,880,529 | 4/1975 | Althause et al. | 356/251 |
| 3,963,356 | 6/1976 | Wicklund | 356/251 |

FOREIGN PATENT DOCUMENTS

| | | |
|---|---|---|
| 1596494 | 7/1970 | France . |
| 562233 | 6/1944 | United Kingdom . |
| 764054 | 12/1956 | United Kingdom . |

Primary Examiner—Eugene R. LaRoche
Assistant Examiner—Robert J. Pascal

[57] ABSTRACT

A sighting device for day and night use having a beam-splitting means mounted in the line of sight between a target and the user's eye, a first source of light, being a self-energized source of artificial light, a second source of light, being an ambient-light admitting element, at least one aiming mark illuminatable by at least one of the sources of light, and at least one light-directing means adapted to project the aiming mark onto the beam-splitting means.

11 Claims, 3 Drawing Sheets

U.S. Patent    Aug. 16, 1988    Sheet 3 of 3    4,764,011
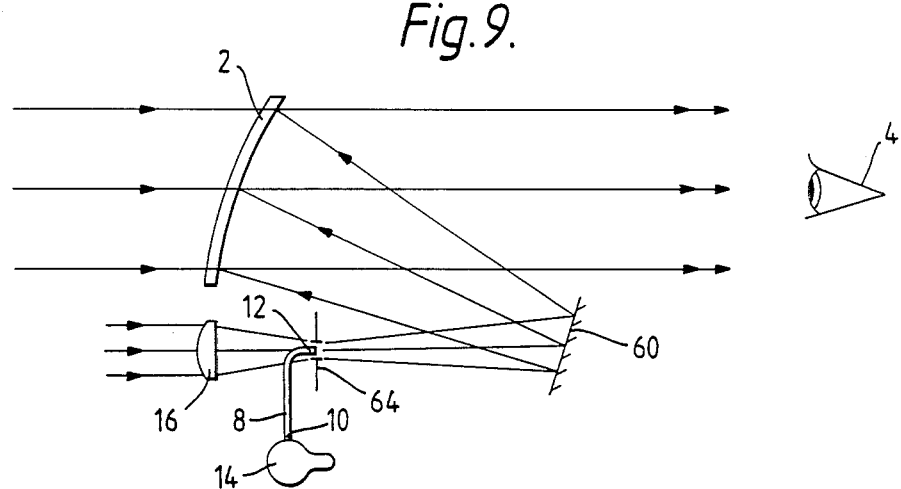
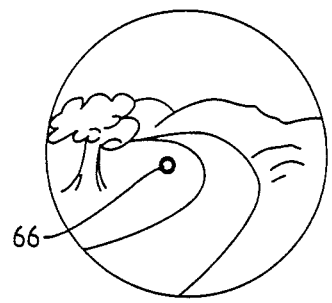 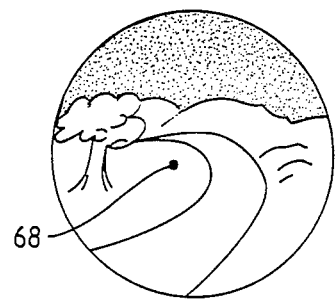
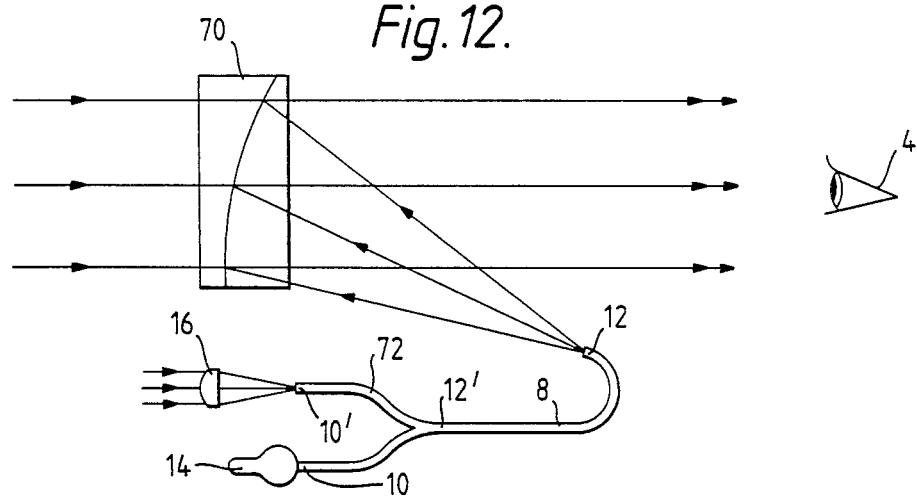

SIGHTING DEVICE FOR DAY AND NIGHT USE

BACKGROUND OF THE INVENTION

The present invention relates to a sighting device such as a gun sight, usable under all light conditions, day or night.

Optical sighting devices in which an aiming mark or a graticule is superimposed on the target as seen through an optical element such as a beam splitter have become very popular in recent years. The user of such a sight need no longer align front and rear sights first between themselves and then with the target as in standard rifle sights, nor does he have to cope with the limited field of telescopic sights and their focusing problems. In these optical sights a mark or graticule serves as aiming point, and the user simply moves the gun until the aiming point, appearing at infinity as superimposed on the target area, is centered on the target (or leads it by the desired amount in case of a moving target).

Such a sighting device was disclosed by Budden et al. (U.S. Pat. No. 4,390,276) and consists of a solid block of glass with plane parallel opposite end faces. A partially reflecting concave surface in the block forms an image at infinity of a graticule which is illuminated by light entering the block through a window.

While the Budden sight has many of the above described advantages, it is limited in that it cannot be used under bad light conditions, not to speak of at dark. Other known gun sights based on the superposition principle have attempted to solve this problem by using a light source such as a miniature bulb to illuminate the graticule, with a battery as power source. Batteries, however, are known to go flat, and/or bulbs to burn out, at critical moments, and contacts and switches, especially of low-voltage circuits, are prone to fouling, especially under field conditions.

It is one of the objects of the present invention to overcome the problematic aspects of the prior-art sights and to provide a sighting device that can be used under any light conditions, uses for graticule illumination a self-energized, radio-luminescent light source of practically unlimited service life, and produces a superimposed aiming point that is clearly visible not only under bad light conditions, but even in full sunlight.

BRIEF SUMMARY OF THE INVENTION

This the invention achieves by providing a sighting device for day and night use, comprising:
- beam-splitting means mounted in the line of sight between a target and the user's eye;
- a first source of light, being a self-energized source of artificial light;
- a second source of light, being an ambient-light admitting element;
- at least one aiming mark illuminatable by at least one of said sources of light, and
- at least one light-directing means adapted to project said aiming mark onto said beam-splitting means.

BRIEF DESCRIPTION OF THE DRAWING

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to shown structural details of the invention in more detail than is necessary for a fundamental understanding of the invention, the description taken with the drawings making apparent to those skilled in the art how the several forms of the invention may be embodied in practice. In the figures:

FIG. 9 is a schematic representation of still another embodiment of the device according to the invention;

FIG. 10 illustrates the target area as seen through the device according to FIG. 9 in daylight;

FIG. 11 shows the same target area as appearing in the dark, and

FIG. 12 is a schematic representation of yet another embodiment of the sighting device according to the invention.

DETAILED DESCRIPTION OF PREFERRED EMBODIMENTS

Figure 1:
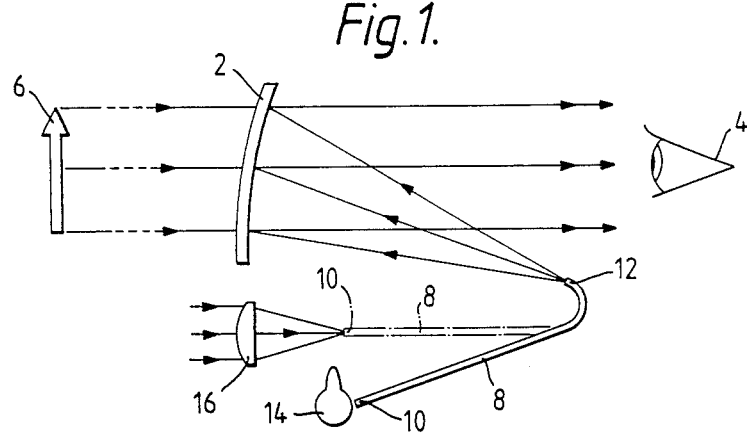
FIG. 1 is a schematic representation of a first embodiment of the sighting device according to the invention.

Referring now to the drawings, there is seen in FIG. 1 a concave, beam-splitting mirror 2 which, however, is not of the spectrally neutral type. This sort of mirror, known as dichroic, has a spectrally selective coating which makes is reflective to a certain range of wavelengths, and transmissive to another range. In this particular case, the "cut-off" line of the coating is at a wavelength of about 550–600 nm. In other words, the "blues" are transmitted, the "reds", reflected. The user 4, looking at the target object 6 thus sees the latter in a sightly bluish tint. The convex surface of the mirror is advantageously provided with an antireflex coating, to reduce losses.

There is further seen an optical fiber 8 serving as light-directing means or light guide and having a light-receiving end 10 and a light-emitting end 12. It is also seen that, with the light-emitting end 12 stationary, the light-receiving end 10 can assume two distinct positions: a first position in which it is located in close proximity to a light source 14 producing artificial light, details about which source will be provided further below, and a second position, indicated by dashed lines, in which this end 10 is at or near the focal point of an ambient-light gathering lens 16. The optical fiber 8 is very thin, having a diameter of about 50 micron. The light-emitting end 12 of the fiber 8 can thus be regarded as a substantially point-like source of light, and as this end 12 is located at a distance from the dichroic mirror 2 which equals the focal length thereof, the mirror 2 turns into a collimator, producing a substantially parallel bundle of rays that has its origin in the light-emitting end 12 of the fiber 8. These parallel rays reaching the user's eye, the point-like, illuminated end 12 is presented to the eye at infinity, and as the user, looking through the mirror, sees at the same time also the target object 6, the illuminated end 12 appears superimposed on the target object 6. In this embodiment, the light-emitting end 12 of the optical fiber therefore serves as aiming mark which, since the dichroic mirror passes the blues and reflects the reds, is seen as red spot.

The double arrows in FIG. 1 are meant to indicate that the bundle of parallel rays is in fact compounded of two bundles: one coming from the target object 6 which is considered as optically located at infinity, and the other as produced by the mirror 2 acting as collimator and thus presenting the aiming mark, i.e., the light-emitting end 12, at infinity, superimposed on the target object 6.

The source 14, commercially available under the brand name of "Beta-light", is self-energized, the light being produced by radio-luminescence. Physically, the source consists of a small hollow glass globule filled with the hydrogen isotope tritium. The decaying tritium (half life over 12,000 years) produces a weak $\beta$-radiation which causes a phosphor coating the inside of the globule to emit light.

Figure 2:
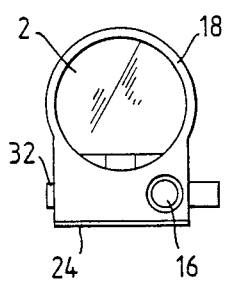
FIGS. 2, 3 and 4 are a front view, a side view and a top view, respectively, of a practical realization of the principles embodied in the schematic representation of FIG. 1.
Figure 3:
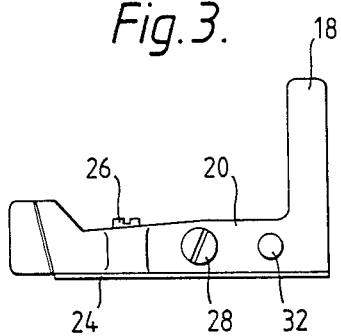
Figure 4:
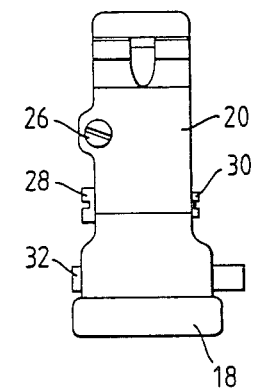
Figure 5:
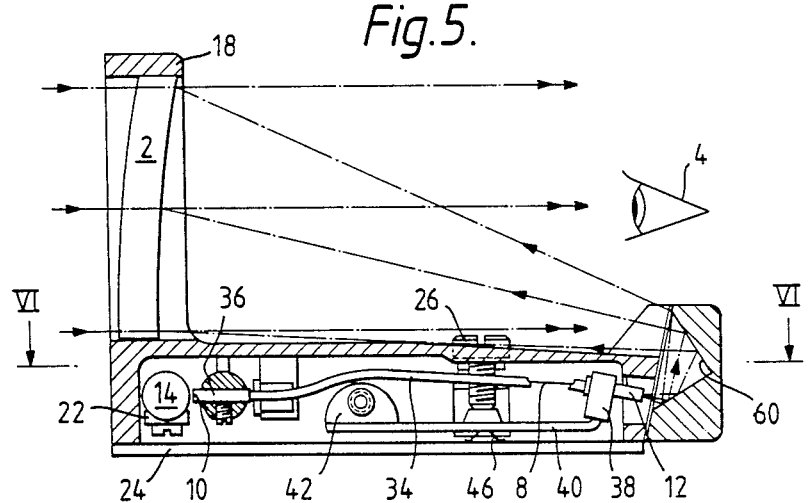
FIG. 5 is a longitudinal cross section, to a larger scale, of the embodiment illustrated by the preceding drawings.
Figure 6:
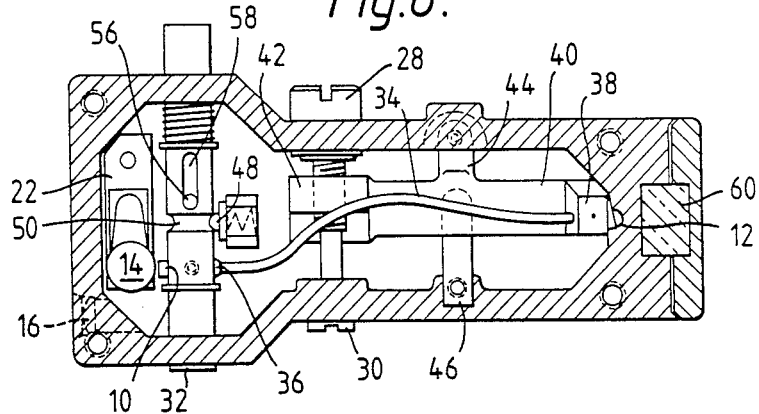
FIG. 6 is a top view, in cross section along plane VI—VI, of the embodiment of FIG. 5, showing the device according to the invention as adjusted for use at bad light conditions or in the dark.
Figure 7:
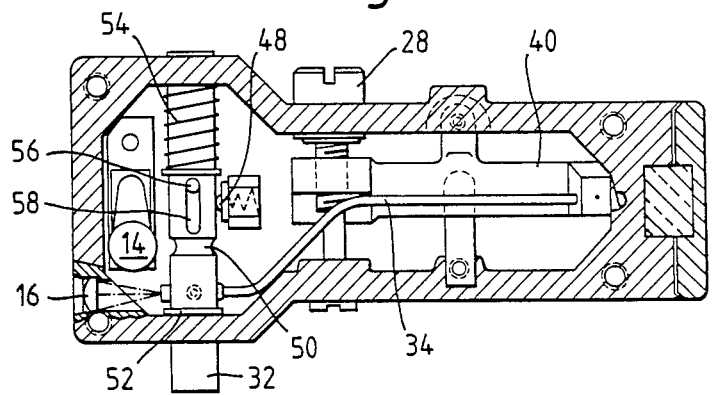
FIG. 7 is an identical cross sectional view, showing the device as adjusted for use in daylight.

A practical realization of the schematic setup of FIG. 1 is seen from the outside in FIGS. 2 to 4, and in various cross-sectional views, in FIGS. 5 to 7.

Visible from the outside is the dichroic mirror 2 mounted in a protective mirror frame 18 that is an internal part of the housing 20. The latter accommodates the rest of the components shown in FIG. 1, such as the light source 14 which is cemented to a bracket 22, the daylight gathering lens 16 and the optical fiber 8. A bottom plate 24 covers and protects the recess in which the above components are mounted.

Further seen, and accessible from the outside, is an adjusting screw 26 for elevation, another adjusting screw 28 for windage, a locking screw 30 for the windage-adjusting screw 28 and a push bar 32 for switching over from position I to position II and back, as explained in conjunction with FIG. 1. The mechanics of these adjustments and of the switch-over will be explained presently in conjunction with FIGS. 5, 6 and 7.

The thin optical fiber 8, protected by a flexible sheath 34, is provided at both of its ends with rigid ferrules 36 by means of which these ends are fixedly attached, on one side to the push bar 32 and, on the other, to a block 38 mounted on a bracket 40 which, by means of a threaded lug 42, can swivel about the threaded portion of the windage-adjusting screw 28. Such a swivel motion can be induced by the elevation-adjusting screw 26 being applied against a lateral arm 44 of the bracket 40, against the restoring force of a flat spring 46. Unscrewing the screw 26 will permit the spring 46 to swivel the bracket 40 back in the opposite direction. Turning the elevation-adjusting screw 26 will thus move the aiming mark which, as will be remembered, is constituted by the light-emitting fiber end 12, in a vertical plane, thereby moving also the line of sight in a vertical plane. Turning the windage-adjusting screw 28 will cause the latter to act like a lead screw, moving the lug 42 and, thereby, the entire bracket 40, in a horizontal plane in direction of the axis of the adjusting screw 28. This movement is of course also shared by the fiber end 12, i.e., by the aiming mark.

The push bar 32 is used, as explained above, to shift the light-receiving end 10 of the optical fiber 8 from position I (FIG. 6) in which use is made, for the illumination of the aiming mark, of the source of artificial light 14, to position II (FIG. 7) in which ambient light is used for illumination. The bar 32 is guided in two oppositely located holes in the housing 20 and is movable in translation between the position shown in FIG. 6 in which a spring-loaded ball detent 48 indexes in an appropriately shaped groove 50 in the bar 32, and the position shown in FIG. 7, in which the bar 32 has been pushed back from the other side, the groove 50 has left the detent 48, and which is now defined by the collar 52 as pressed against the recess wall by the compression spring 54. Rotation of bar 32 is prevented by a pin 56 fixedly attached to the housing 20, which passes through an elongated hole 58 long enough to accommodate the required shifting "stroke" of bar 32.

An additional optical component, seen to best advantage in FIG. 5, is a deflecting prism 60, which is used to "fold" the aiming-mark light path back upon itself.

Figure 8:
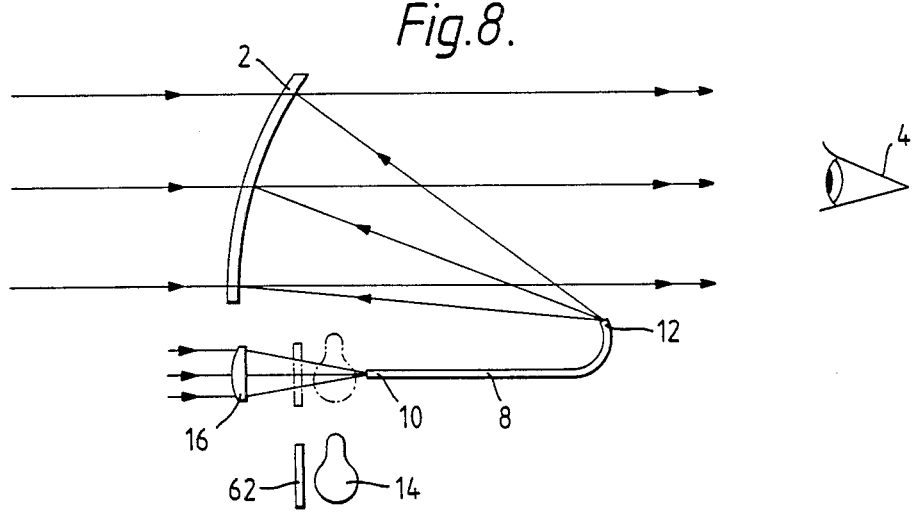
FIG. 8 is a schematic representation of another embodiment of the sighting device according to the invention.

Another embodiment of the sighting device according to the invention is shown in the schematic representation of FIG. 8, which differs from that illustrated in the previous drawings in that the switching-over from one mode of aiming-mark illumination to the other is here accomplished not by moving the light-receiving end 10 of the optical fiber 8, but by moving the source of artificial light 14. As drawn in FIG. 8, the sighting device is set for ambient-light illumination, with the source 14 below out of the way. To adjust the sighting device for night use, the source 14 is simply moved up, until it is in close proximity to the light-receiving end 10, as indicated by the dashed lines. Also provided is a light shield 62 which moves together with the source 14, and which prevents light from the source escaping through the collecting lens 16, possibly to be seen from afar, giving away the position of the gun and its user.

Still another embodiment is schematically illustrated in FIG. 9. It differs from the preceding embodiments in that there is no need to move elements to switch over from one mode to the other and, therefore, there are no moving parts (other than the necessary arrangements for correction of elevation and windage). In this embodiment both sources of light are used simultaneously. As before, the light-emitting end 12 of the optical fiber 8 is the point-like aiming mark being illuminated by the artificial source 14, to which the light-receiving end 10 is cemented. There is, however, a second aiming mark in the form of a pin hole 64, illuminated by the ambient-light gathering lens 16, which pin hole is co-planar with, and concentrically surrounds, the first aiming mark, i.e., the light-emitting end 12. The size of this pin hole 64 is about 200 micron as against the 50-micron diameter of the optical fiber 8. The second aiming mark is thus in the shape of a ring, having an outside diameter of about 200 micron and an inside diameter of about 50 micron. The appearance, to the user, of these two aiming marks is illustrated in FIGS. 10 and 11. FIG. 10 shows the target area as seen through the dichroic mirror in daylight, with the pin-hole produced aiming mark appearing as a brilliant, orange-colored ring 66. FIG. 11, on the other hand represents the target area at dark, with the fiber-end-produced aiming mark appearing as a prominent red spot 68. In FIG. 10, the central red spot 68 is absent, because the light from the artificial source 14 is relatively weak compared to the ambient light that produces the ring-like mark 66; in FIG. 10 the ring mark 66 is absent, because in the dark there is no ambient light to produce such a ring. Under twilight conditions (dawn or dusk) both marks will be visible, i.e., the user will see an orange ring with a central red spot.

Yet another embodiment is schematically illustrated in FIG. 12, in which the dichroic mirror 2 has been replaced (as it could have been also in the other embodiments) by a plane-parallel lens doublet 70 having zero magnification (as has the mirror 2), one of the contacting faces of which doublet has been provided with a dichroic coating. Here, too, both light sources have simultaneous access to the fiber 8 and its light-emitting end 12, and there is, therefore, no need for relative movement of fiber and light source 14 as in the embodiments of FIGS. 1 and 8. However, there is only one aiming mark, constituted by the light-emitting end 12, which is illuminated either by light source 14 (at dark) or by ambient light, through lens 16, and light source 14 together, resulting in a red aiming point as in FIG. 11. This is achieved by providing a second optical fiber 72, having a light-receiving end 10' located at the focal point of the ambient-light gathering lens 16. Its other end 12' is optically spliced to fiber 8. The splicing technique used is well established in fiber optics.

An embodiment could also be envisaged which would combine certain features of the embodiments of FIGS. 8 and 9, e.g., the movable light source 14 and its shield 62 of FIG. 8, and the reflector 60 and the pin hole 64 of FIG. 9. Such an embodiment would thus have no light-directing means in the form of optical fibers.

In another fiber-less embodiment envisaged, the light source 14 could be stationary, light from this source being directed to the pin hole 64 by means of a beam-splitting mirror or prism.

Although in the embodiments discussed the ambient-light gathering element was always described as a lens, it is possible to dispense with the lens by enlarging the size of the window opening.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A sighting device for day and night use, comprising: a first source of light being a self-energized source of artificial light; a second source of light being a means for admitting ambient light; a single optic fiber having a light-receiving end adapted to be exposed to at least said first source of light and also having a light-emitting end; a single aiming mark; and beam-splitting means; said light-emitting end of said single optic fiber constituting said single aiming mark; said single aiming mark, at least when exposed to said first source of light, being projected onto said beam-splitting means to produce an image of said aiming mark at infinity.

2. A sighting device according to claim 1, wherein the light-receiving end of the optic fiber is movable to a position in which it is exposed to the ambient light admitting means.

3. A sighting device according to claim 1, wherein the source of artificial light is movable between a first position in which it illuminates the light-receiving end of the optical fiber, and a second position in which the light-receiving end of the optical fiber is exposed to the ambient light admitting means.

4. A sighting device according to claim 1, wherein the light-emitting end of the optical fiber is located at the center of a pinhole exposed to the ambient light admitting means.

5. A sighting device according to claim 1, wherein the optic fiber is a spliced fiber having a first light-receiving end exposed to the source of artificial light, a second light-receiving end exposed to the ambient light admitting means, and a single light-emitting end constituting the aiming mark.

6. The sighting device as claimed in claim 1, wherein said beam-splitting means is a concave dichroic mirror.

7. The sighting device as claimed in claim 6, wherein said dichroic mirror has a cut-off point at a wavelength of between 550 and 600 nm.

8. The sighting device as claimed in claim 1, wherein said beam-splitting means is a lens doublet having at least one contacting face provided with a dichroic coating.

9. The sighting device as claimed in claim 1, wherein said self-energizing light source is a radio-luminescent source contained in a hollow glass globule.

10. The sighting device as claimed in claim 1, wherein said means for admitting ambient light is constituted by a window aperture.

11. The sighting device as claimed in claim 10, wherein said window aperture is provided with an ambient-light gathering member, and wherein the light-receiving end of said optic fiber is at least temporarily located at least in proximity to the focal point of said light-gathering member.

* * * * *